US010749420B2

(12) United States Patent
Takahashi et al.

(10) Patent No.: US 10,749,420 B2
(45) Date of Patent: Aug. 18, 2020

(54) SYNCHRONOUS RELUCTANCE ROTATING ELECTRICAL MACHINE

(71) Applicants: Kabushiki Kaisha Toshiba, Minato-ku (JP); Toshiba Infrastructure Systems & Solutions Corporation, Kawasaki-shi (JP)

(72) Inventors: Norio Takahashi, Yokohama (JP); Katsutoku Takeuchi, Kokubunji (JP); Makoto Matsushita, Fuchu (JP); Daisuke Misu, Tama (JP); Toshio Hasebe, Hachioji (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 16/211,576

(22) Filed: Dec. 6, 2018

(65) Prior Publication Data

US 2019/0109527 A1 Apr. 11, 2019

Related U.S. Application Data

(63) Continuation of application No. PCT/JP2017/023249, filed on Jun. 23, 2017.

(30) Foreign Application Priority Data

Jun. 29, 2016 (JP) .................. 2016-129202

(51) Int. Cl.
*H02K 19/10* (2006.01)
*H02K 1/27* (2006.01)
*H02K 1/24* (2006.01)

(52) U.S. Cl.
CPC ........... *H02K 19/103* (2013.01); *H02K 1/246* (2013.01); *H02K 1/2766* (2013.01); *H02K 19/10* (2013.01); *H02K 2201/06* (2013.01)

(58) Field of Classification Search
CPC .......... H02K 1/246; H02K 1/276; H02K 1/24; H02K 1/2706; H02K 1/2766; H02K 19/10;

(Continued)

(56) References Cited

U.S. PATENT DOCUMENTS

| 6,300,703 | B1 | 10/2001 | Kawano et al. | |
| 2008/0290753 | A1* | 11/2008 | Arimitsu | H02K 1/246 310/156.36 |

(Continued)

FOREIGN PATENT DOCUMENTS

| CN | 107852075 A | 3/2018 |
| EP | 3 288 160 A1 | 2/2018 |

(Continued)

OTHER PUBLICATIONS

Tamiya Yoichi, Achiwa Norihiro, Fujimura Satoru, Inoue Masaya, Mori Kunio, Nakamoto Michio, Reluctance Motor, Sep. 21, 2001, JP 2001258222 (English Machine Translation) (Year: 2001).*

(Continued)

*Primary Examiner* — Quyen P Leung
*Assistant Examiner* — Alexander A Singh
(74) *Attorney, Agent, or Firm* — Oblon, McClelland, Maier & Neustadt, L.L.P.

(57) ABSTRACT

According to one embodiment a synchronous reluctance rotating electrical machine of an embodiment has a shaft and a rotor core. The rotor core is fixed to the shaft, in which cavity portions being formed in a projected shape toward a radially inward direction are formed into multilayers for each pole and bridges are respectively formed between the cavity portions and an outer circumferential surface. The thickness of an outermost bridge positioned outermost on the pole end side among the plurality of bridges is formed to (Continued)

be gradually thicker from the pole center side toward the pole end side. Among the plurality of bridges, the thickness of an intermediate bridge positioned on the pole center side of the outermost bridge with one bridge interposed therebetween is formed to be gradually thicker from the pole end side toward the pole center side.

3 Claims, 5 Drawing Sheets

(58) Field of Classification Search
CPC .. H02K 19/103; H02K 2201/06; H02K 25/00; H02K 21/00; H02K 21/028
USPC ............. 310/156.57, 156.53, 156.56, 156.39
See application file for complete search history.

(56) References Cited

U.S. PATENT DOCUMENTS

2012/0062053 A1* 3/2012 Moghaddam .......... H02K 1/246
310/46

2013/0147303 A1 6/2013 Kaiser et al.

FOREIGN PATENT DOCUMENTS

| JP | 10-257700 | 9/1998 |
| JP | 11-89193 | 3/1999 |
| JP | 2001-186735 A | 7/2001 |
| JP | 2001-258222 | 9/2001 |
| JP | 2001258222 A * | 9/2001 |
| JP | 2002-165427 | 6/2002 |
| JP | 2002-272036 | 9/2002 |
| JP | 3940207 | 7/2007 |
| JP | 4367375 | 11/2009 |
| KR | 10-2007-0007672 A | 1/2007 |

OTHER PUBLICATIONS

International Search Report dated Sep. 5, 2017 in PCT/JP2017/023249, filed on Jun. 23, 2017 (with English Translation).
Extended European Search Report dated Dec. 12, 2019 in European Patent Application No. 17820062.2, 7 pages.

* cited by examiner

SYNCHRONOUS RELUCTANCE ROTATING ELECTRICAL MACHINE

CROSS-REFERENCE TO RELATED APPLICATION

This is a Continuation Application of International Application No. PCT/JP2017/023249, filed on Jun. 23, 2017, which claims priority to Japanese Patent Application No. 2016-129202, filed on Jun. 29, 2016, and the entire contents of all of the aforementioned applications are incorporated herein by reference.

FIELD

Embodiments described herein relate generally to a synchronous reluctance rotating electrical machine.

BACKGROUND

The synchronous reluctance rotating electrical machine includes a rotor and a stator. The rotor includes a shaft which rotatably pivots and extends axially around a rotating shaft, and a rotor core which is externally fitted to and fixed to the shaft. The stator includes a stator core which is disposed around an outer peripheral portion of the rotor core while being spaced apart from the rotor core and has a plurality of teeth arranged at intervals in a circumferential direction, and a multi-phase armature winding with multiple poles, which is wound on each of the plurality of teeth.

In the rotor core, a plurality of cavity portions for each pole are formed parallel to each other in a radial direction. It is often the case that, in order to conform to a flow of magnetic flux formed when the armature winding is energized, each of the cavity portions is formed to be curved inward in a radial direction, so that a pole center is located innermost in the radial direction.

By forming the cavity portion in this manner, a direction in which it is easy for a magnetic flux to flow and a direction in which it is difficult for the magnetic flux to flow are formed in the rotor core. Also, a synchronous reluctance rotating electrical machine uses the reluctance torque generated by the cavity portions to rotate the shaft.

By the way, it can be expected that a synchronous reluctance rotating electrical machine should be able to be applied in various fields and achieving higher output and reduction in size is required. Accordingly, it is desired to realize a larger capacity and a higher rotation speed for a synchronous reluctance rotating electrical machine. On the other hand, if cavity portions are formed in the rotor core, the rotor core can be deformed easily. For this reason, when a rotor core is rotated at a high speed, there is a likelihood that the rotor core will be deformed by a centrifugal force generated by the high-speed rotation. Thus, there is a case in which deformation of the rotor core is made difficult by increasing the thickness of a portion called a bridge formed between both circumferential ends of a cavity portion and the rotor core, or by forming a structure called a center bridge at a center of a cavity portion in the circumferential direction.

However, if the thickness of a bridge is increased or a center bridge is formed, there are cases in which magnetic saturation of these bridges is prevented. For this reason, it is then difficult to obtain a desired reluctance torque, and there is a likelihood that the torque characteristics of a synchronous reluctance rotating electrical machine will deteriorate.

DETAILED DESCRIPTION

According to one embodiment, a synchronous reluctance rotating electrical machine includes a shaft and a rotor core. The rotor core is fixed to the shaft, in which cavity portions being formed in a projected shape inward in a radial direction are formed into multilayers for each pole and bridges are respectively formed between the cavity portions and an outer circumferential surface. When a center of the one pole in a circumferential direction is a pole center and both ends in the circumferential direction are pole ends, an outermost bridge positioned outermost on the pole end side among the plurality of bridges is formed such that the thickness of the outermost bridge becomes gradually thicker from the pole center side toward the pole end side. An intermediate bridge positioned on the pole center side of the outermost bridge with one bridge interposed therebetween among the plurality of bridges is formed such that the thickness of the intermediate bridge becomes gradually thicker from the pole end side toward the pole center side.

Hereinafter, a synchronous reluctance rotating electrical machine of an embodiment will be described with reference to the drawings.

Figure 1:
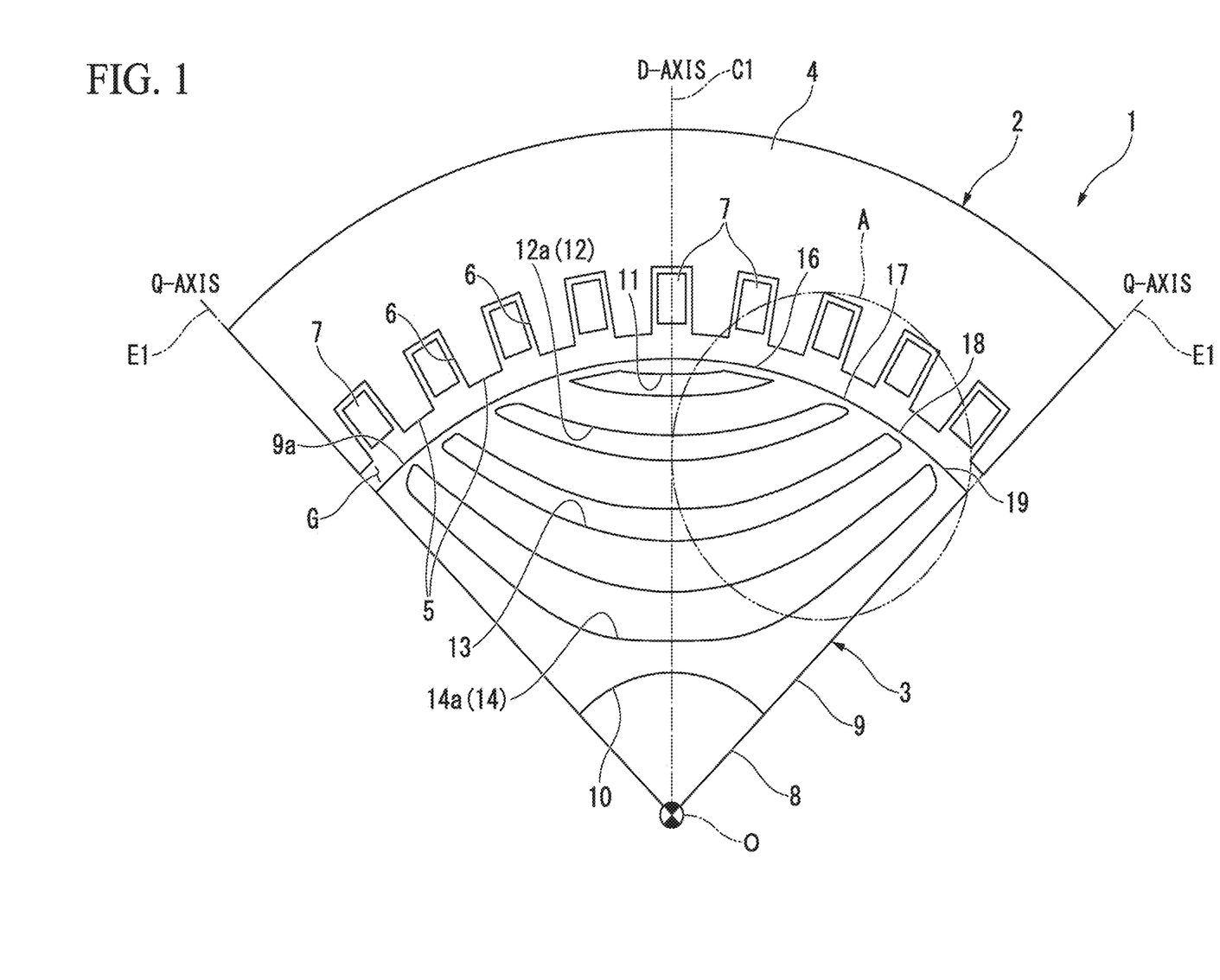
FIG. 1 is a cross-sectional view perpendicular to a rotational axis which shows part of a configuration of a synchronous reluctance rotating electrical machine according to a first embodiment.

FIG. 1 is a cross-sectional view perpendicular to a rotating shaft 8 which shows part of a configuration of a synchronous reluctance rotating electrical machine (hereinafter, simply referred to as a rotating electrical machine) 1. Also, FIG. 1 shows a ¼ sector of the rotating electric machine 1, i.e., only a ¼ circumferential angular region.

As shown in the figure, the rotating electric machine 1 includes a substantially cylindrical stator 2, and a rotor 3 which is disposed radially inside the stator 2 and provided to be rotatable relative to the stator 2. The stator 2 and the rotor 3 are arranged with their central axes positioned on a common axis. Hereinafter, the common axis is referred to as a central axis (rotational axis line) O, a direction perpendicular to the central axis O is referred to as a radial direction, and a direction of rotation around the central axis O is referred to as a circumferential direction.

The stator 2 has a stator core 4 having a substantially cylindrical shape. The stator core 4 can be formed by stacking a plurality of electromagnetic steel sheets or by press molding a soft magnetic powder. A plurality of teeth 5 which protrude toward the central axis O and are arranged at equal intervals in the circumferential direction are integrally formed on an inner circumferential surface of the stator core 4. The teeth 5 are formed in a substantially rectangular shape in a cross section. Also, a plurality of slots 6 are formed at regular intervals in the circumferential direction such that each slot 6 is disposed between neighboring teeth 5. An armature winding 7 is wound around each of the teeth 5 through these slots 6. In each tooth 5, the armature winding 7 is wound on an insulator or an insulating film.

First Embodiment

The rotor 3 includes a rotating shaft 8 extending along the central axis O, and a rotor core 9 which has a substantially circular columnar shape and fitted outside and fixed to the rotating shaft 8.

The rotor core 9 can be formed by stacking a plurality of electromagnetic steel sheets or press molding a soft magnetic powder. An outer diameter of the rotor core 9 is determined such that a predetermined air gap G is formed between the rotor core 9 and each of the teeth 5 which face each other in the radial direction.

Also, a through hole 10 which passes through along the central axis O is formed at the radial center of the rotor core 9. The rotating shaft 8 is fitted into this through hole 10 by press-fitting or the like and the rotating shaft 8 and the rotor core 9 rotate integrally.

In addition, in each of ¼ circumferential angular regions of the rotor core 9, four-layered cavity portions (flux barrier) 11, 12, 13 and 14 (a first cavity portion 11, a second cavity portion 12, a third cavity portion 13 and a fourth cavity portion 14) are formed in parallel in the radial direction. That is, the first cavity portion 11 is formed on the outermost side in the radial direction, and in the radially inward direction from the first cavity portion 11, the second cavity portion 12, the third cavity portion 13 and the fourth cavity portion 14 are formed in parallel. Also, the fourth cavity portion 14 is disposed on the innermost side in the radial direction.

In addition, the cavity portions 11 to 14 are formed along a flow of magnetic flux formed when the armature winding 7 is energized. In other words, each of the cavity portions 11 to 14 is formed to be curved such that its center in the circumferential direction is positioned innermost in the radial direction (so as to be formed in a projected shape in the radially inward direction). With this, in the rotor core 9, a direction in which the magnetic flux is easy to flow and a direction in which the magnetic flux is difficult to flow are formed.

Here, in the present embodiment, the direction in which the magnetic flux is easy to flow is referred to as a q-axis. The direction along the radial direction electrically and magnetically orthogonal to the q-axis is referred to as a d-axis. That is, each of the cavity portions 11 to 14 forms a multilayer structure in the radial direction along the d-axis.

More specifically, the q-axis direction in the rotor core 9 is such that the direction in which the flow of a magnetic flux is not obstructed by the cavity portions 11 to 14 is referred to as the q-axis. In other words, a positive magnetic position (for example, bringing an N pole of a magnet closer) is applied at an arbitrary circumferential angular position on an outer circumferential surface 9a of the rotor core 9. In addition, a negative magnetic position (for example, bringing an S pole of a magnet closer) is applied to another arbitrary circumferential angular position displaced by one pole (a mechanical angle of 90 degrees in the case of the present embodiment) relative to the positive magnetic position. Also, in this case, the direction toward the arbitrary position from the central axis O when most magnetic flux flows in the case where the arbitrary position is deviated in the circumferential direction is defined as the q-axis. Also, the longitudinal direction in the cavity portions 11 to 14 is the q-axis.

On the other hand, the direction in which the flow of the magnetic flux is obstructed by each of the cavity portions 11 to 14, that is, the direction magnetically orthogonal to the q-axis is referred to as the d-axis. In the present embodiment, the d-axis is the direction parallel to the direction in which two portions of the rotor core separated by the respective cavity portions 11 to 14 and respectively formed into a region close to the central axis O and a region distant from the central axis O face each other. In the case where the cavity portions 11 to 14 are formed as multiple layers (four layers in the present embodiment), the direction in which the layers overlap is the d-axis. In the present embodiment, the d-axis is not limited to being electrically and magnetically orthogonal to the q-axis and may intersect at a certain angle size (for example, about 10 degrees in mechanical angle) from an orthogonal angle.

As such, the rotor core 9 has four poles and the four cavity portions 11, 12, 13, and 14 are formed for each pole (¼ circumferential angular region of the rotor core 9). Also, the one pole refers to the region between the q-axes.

Further, in the following description, the d-axis is referred to as a pole center C1 and the q-axis (both of the circumferential ends of the ¼ circumferential angular region) is referred to as a pole end E1. In other words, each of the cavity portions 11 to 14 is curved inward in the radial direction so that the pole center C1 is located innermost in the radial direction.

Each of the cavity portions 11 to 14 is formed to be curved such that both ends in the longitudinal direction are positioned on an outer peripheral portion of the rotor core 9 when viewed from a central axis O direction. Further, each of the cavity portions 11 to 14 is formed such that it follows the pole ends E1 at positions closer to both ends in the longitudinal direction and becomes closer to being orthogonal to the pole center C1 as a position becomes closer to the center in the longitudinal direction. In addition, the cavity portions 11 to 14 are formed such that their opening areas become respectively gradually larger from the first cavity portion 11.

Figure 2:
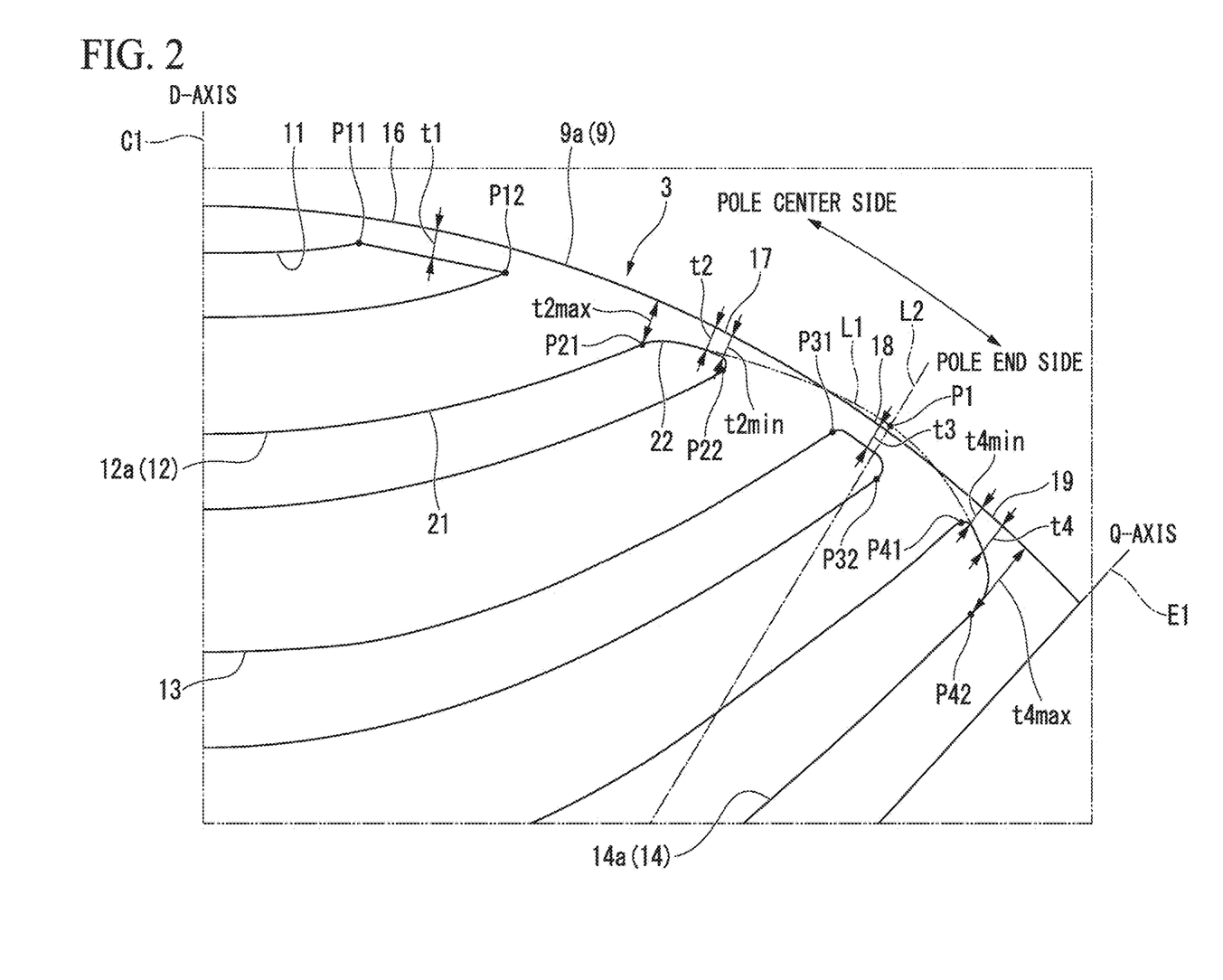
FIG. 2 is an enlarged view of a section A in FIG. 1.

FIG. 2 is an enlarged view of a section A of FIG. 1.

As shown in the figure, bridges 16, 17, 18, and 19 (a first bridge 16, a second bridge 17, a third bridge 18 and a fourth bridge 19) are provided between the ends of the cavity portions 11 to 14 in the circumferential direction and the outer circumferential surface 9a of the rotor core 9. More specifically, the bridges 16 to 19 refer to what are formed in an area of the cavity portions 11 to 14 near the outer peripheral portion of the rotor core 9 and in an area in which its thickness changes rapidly (the same applies to the following second embodiment).

Also, the thickness refers to the thickness in a direction normal to the outer circumferential surface 9a of the rotor core 9 (the same applies to the following second embodiment).

More specifically, in the outer peripheral portion of the rotor core 9, there are points of rapid change in thickness P41 and P42, in which the thickness drastically changes respectively on the pole center C1 side and the pole end E1 side, at a position corresponding to the fourth cavity portion 14, and the portion between the rapid change points in thickness P41 and P42 becomes the fourth bridge 19.

Also, in the outer peripheral portion of the rotor core 9, there are points of rapid change in thickness P31 and P32, in which the thickness drastically changes respectively on the pole center C1 side and the pole end E1 side, at a position corresponding to the third cavity portion 13, and the portion between the rapid change points in thickness P31 and P32 becomes the third bridge 18.

Further, in the outer peripheral portion of the rotor core 9, there are points of rapid change in thickness P21 and P22, in which the thickness drastically changes respectively on the pole center C1 side and the pole end E1 side, at a position corresponding to the second cavity portion 12, and the portion between the rapid change points in thickness P21 and P22 becomes the second bridge 17.

In addition, in the outer peripheral portion of the rotor core 9, there are points of rapid change in thickness P11 and P12, in which the thickness drastically changes respectively on the pole center C1 side and the pole end E1 side, at a position corresponding to the first cavity portion 11, and the portion between the rapid change points in thickness P11 and P12 becomes the first bridge 16.

Here, the rapid change point of thickness P21 of the rotor core 9 in the second bridge 17 will be described in a greater detail. A side surface 12a that becomes a radially outer side of the second cavity portion 12 in the rotor core 9 has an inwardly curved surface 21 which is curved toward the radially inward direction, and an outwardly curved surface 22 which is positioned on an outer circumferential side of the rotor core 9 with respect to the curved surface 21 and is curved outward in the radial direction. The connection point (inflection point) between the inwardly curved surface 21 and the outwardly curved surface 22 is the rapid change point of thickness P21.

Although each of the bridges 16 to 19 is intended to make the rotor core 9 less susceptible to deformation, it also becomes a cause of magnetic flux leakage.

Here, the thickness t1 of the first bridge 16 and the thickness t3 of the third bridge 18 are set to be substantially uniform along the outer circumferential surface 9a of the rotor core 9. These thicknesses t1 and t3 are set to have thicknesses such that magnetic saturation is caused in the first bridge 16 and the third bridge 18 so that almost no magnetic flux leakage occurs.

In contrast, the thickness t4 of the fourth bridge 19 is set to become gradually thicker from the pole center C1 side toward the pole end E1 side. In other words, the thickness t4 of the fourth bridge 19 is set such that the thickness t4max at the rapid change point in thickness P42 becomes the thickest.

On the other hand, the thickness of a thin portion t4min formed to be thinnest in the fourth bridge 19 is set to substantially the same as the thickness t1 of the first bridge 16 and the thickness t3 of the third bridge 18.

Further, the thickness t2 of the second bridge 17 positioned on the pole center C1 side of the fourth bridge 19 with one bridge 18 (the third bridge 18) interposed therebetween, is set to gradually increase in size from the pole end E1 side toward the pole center C1 side. In other words, the thickness t2 of the second bridge 17 is set such that the thickness t2max at the rapid change point of thickness P21 becomes the thickest.

On the other hand, the thickness of a thin portion t2min formed to be thinnest in the second bridge 17 is set to substantially the same thickness as the thickness t1 of the first bridge 16 and the thickness t3 of the third bridge 18.

Here, according to the shape of the respective cavity portions 11 to 14, core members are disposed between the cavity portions 11 to 14 in each pole of the rotor core 9. That is, a first core member is disposed between the first cavity portion 11 and the second cavity portion 12, a second core member is disposed between the second cavity portion 12 and the third cavity portion 13, a third core member is disposed between the third cavity portion 13 and the fourth cavity portion 14. The weight of the core members becomes heavier as they become disposed further inward in the radial direction. That is, the weight of the second core member is larger than the weight of the first core member, and the weight of the third core member is larger than the weight of the second core member. In addition, the centrifugal forces of the core members generated when the rotor core 9 is rotated are supported by the bridges 16 to 19.

Further, the bridges 16 to 19 are connected to each other, and the bridges 16 to 19 sequentially positioned further radially inward support the centrifugal forces of the core members which occur in the bridges 16 to 19 positioned radially outward therefrom.

More specifically, because of a force due to the centrifugal force applied to the rotor core 9 (third core member) between the third cavity portion 13 and the fourth cavity portion 14 in the rotor core 9, stress is mainly generated in the third bridge 18. In addition to this, a stress is also generated in the fourth bridge 19.

In addition, a force by the centrifugal force applied to the rotor core 9 (second core member) between the second cavity portion 12 and the third cavity portion 13 in the rotor core 9 generates a stress in the second bridge 17.

Further, the weights of the core members (the first core member, the second core member and the third core member) disposed between the cavity portions 11 to 14 in each pole of the rotor core 9 are formed such that the closer the core member is positioned inward in the radial direction, the heavier the weight of the core member becomes. Thus, among the bridges 16 to 19, increasing stresses are generated as they become located closer to the pole end E1 side.

Here, in the rotor core 9:

(1) The fourth bridge 19 is formed such that the thickness t4 gradually increases from the pole center C1 side toward the pole end E1 side. Further, the second bridge 17 is formed such that the thickness t2 gradually increases from the pole end E1 side toward the pole center C1 side.

Then, when formed in this way, (2) when a curved line passing through the side surface of the second bridge 17 on the second cavity portion 12 side and the side surface of the fourth bridge 19 on the fourth cavity portion 14 side is a virtual curved line L1, a straight line L2 connecting the central axis O and a point P1 on the imaginary curved line L1, which is most distant from the central axis O, passes through the third bridge 18. In other words, the third bridge 18 can be made difficult to deform.

From these (1) and (2), it is possible to make it difficult to deform the second bridge 17 to the fourth bridge 19 on which a large stress is applied due to a force due to a centrifugal force. As a result, it is possible to make the entire rotor core 9 less deformable.

Figure 3:
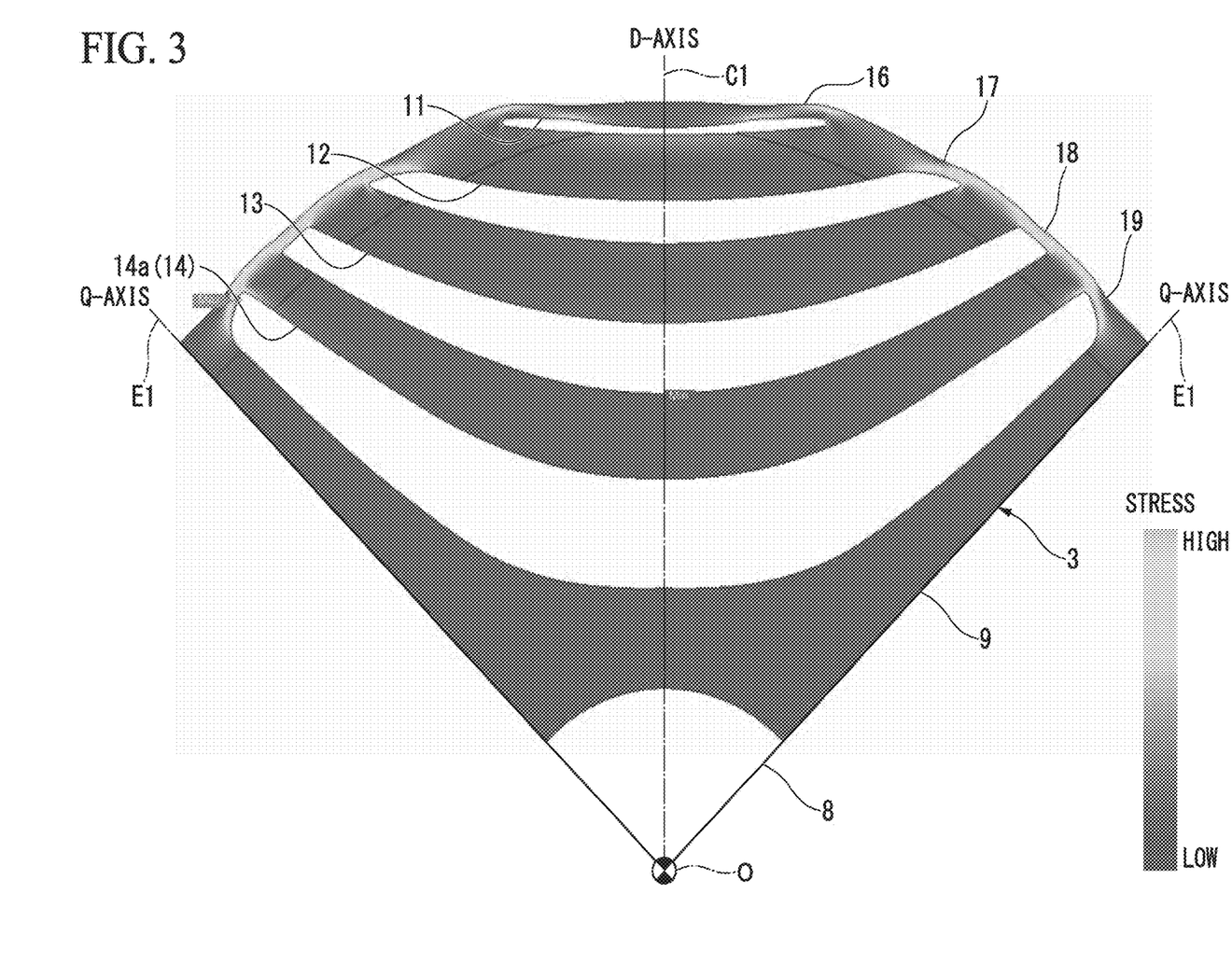
FIG. 3 is a stress distribution diagram of a rotor core of the first embodiment.

FIG. 3 is a stress distribution diagram applied to the rotor core 9 when the rotor 3 is rotated at a high speed.

As shown in the figure, it can be confirmed that the average stress applied to all of the bridges (the first to fourth bridges 16 to 19) is reduced and the maximum stress applied to each of the bridges 16 to 19 is suppressed.

Here, the second bridge 17 and the fourth bridge 19 are not formed to be thick as a whole, but gradually thicken along the outer circumferential surface 9a of the rotor core 9. For this reason, magnetic saturation occurs in the thin portion t2min of the second bridge 17 and the thin portion t4min of the fourth bridge 19. As a result, magnetic flux leakage at the second bridge 17 and the fourth bridge 19 can be minimized.

Therefore, according to the aforementioned first embodiment, it is possible to make the rotor core 9 less deformable and to prevent the torque characteristics of the rotating electric machine 1 from deteriorating.

Second Embodiment

Next, a second embodiment will be described.

Figure 4:
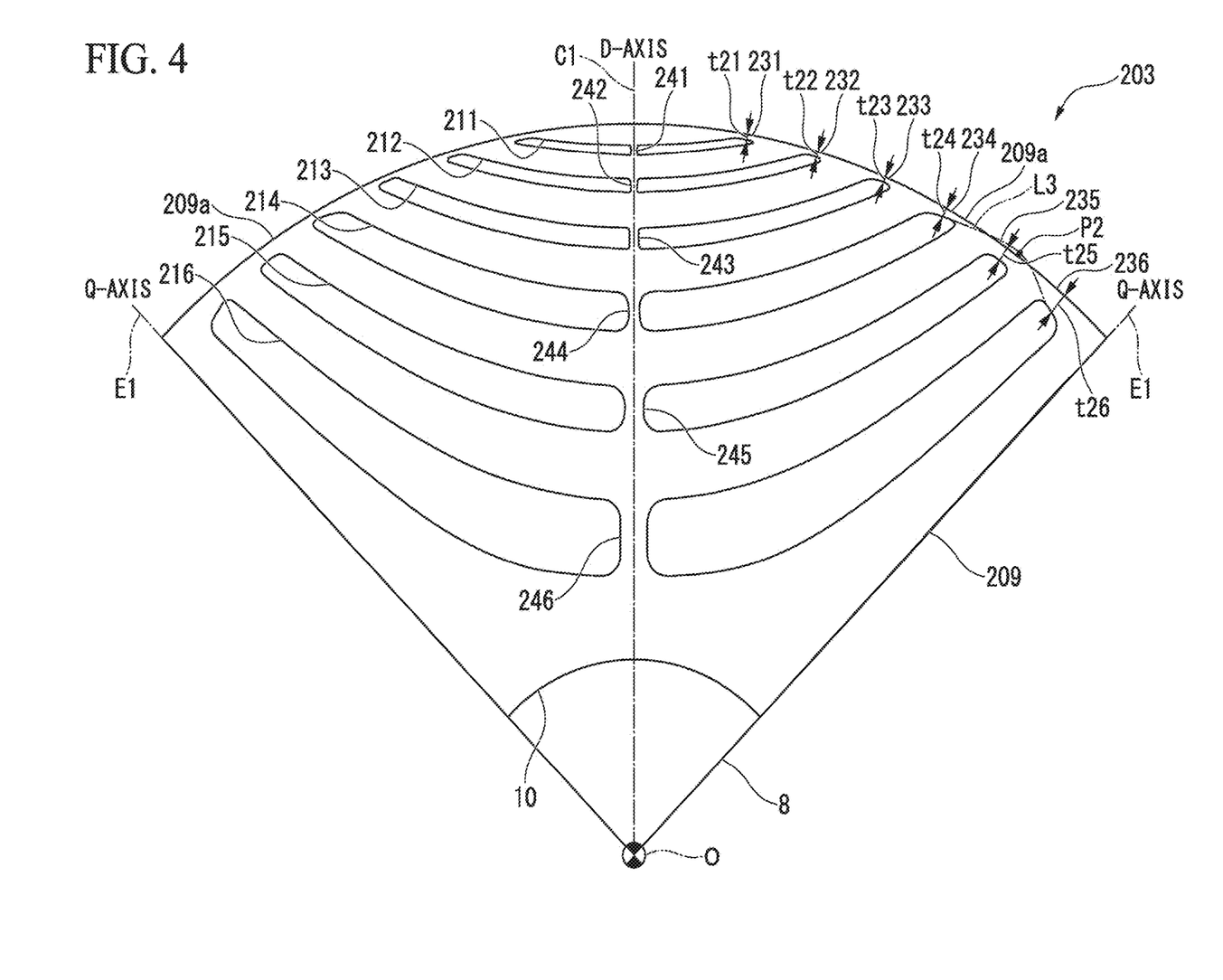
FIG. 4 is a cross-sectional view perpendicular to a rotational axis which shows part of a configuration of a rotor core of a second embodiment.

FIG. 4 is a cross-sectional view perpendicular to a rotating shaft 8 which shows a configuration of a ¼ circumferential angular region in a rotor core 209 of the second embodiment.

As shown in the figure, a difference between the first embodiment and the second embodiment is that, the rotor core 9 of the first embodiment has four layers as cavity portions 11 to 14 formed for each pole, whereas the rotor core 209 of the second embodiment has six layers of cavity portions 211 to 216 formed for each pole (a first cavity portion 211, a second cavity portion 212, a third cavity portion 213, a fourth cavity portion 214, a fifth cavity portion 215 and a sixth cavity portion 216).

That is, the first cavity portion 211 is formed on a the radially outermost side, and the second cavity portion 212, the third cavity portion 213, the fourth cavity portion 214, the fifth cavity portion 215 and the sixth cavity portion 216 are parallelly formed in this order from the first cavity portion 211 in the radially inward direction. Also, the sixth cavity portion 216 is disposed on the radially innermost side.

In addition, each of the cavity portions 211 to 216 is curved inward in the radial direction so that the pole center C1 is positioned on the radially innermost side. Further, each of the cavity portions 211 to 216 is formed to be curved such that both longitudinal ends thereof are positioned on the outer peripheral portion of the rotor core 9 when viewed from the central axis O direction. Also, each of the cavity portions 211 to 216 is formed such that it follows the pole ends E1 at positions closer to both ends in the longitudinal direction and becomes closer to being orthogonal to the pole center C1 as a position becomes closer to the center in the longitudinal direction. Furthermore, the cavity portions 211 to 216 are formed such that the respective opening areas thereof increase sequentially from the first cavity portion 211.

Moreover, at the circumferential center (on the pole center C1) of each of the cavity portions 211 to 216, center bridges 241 to 246 (a first center bridge 241, a second center bridge 242, a third center bridge 243, a fourth center bridge 244, a fifth center bridge 245 and a sixth center bridge 246) are respectively formed. These center bridges 241 to 246 are for making the rotor core 209 less deformable.

Also, between both ends of each of the cavity portions 211 to 216 in the circumferential direction and the outer circumferential surface 209a of the rotor core 209, bridges 231 to 236 (a first bridge 231, a second bridge 232, a third bridge 233, a fourth bridge 234, a fifth bridge 235 and a sixth bridge 236) are respectively formed.

Here, the thickness t21 of the first bridge 231, the thickness t22 of the second bridge 232, the thickness t23 of the third bridge 233 and the thickness t24 of the fifth bridge 235 are set to be substantially uniform along the outer circumferential surface 209a of the rotor core 209.

In contrast, the thickness t26 of the sixth bridge 236 formed between the radially innermost sixth cavity portion 216 and the outer circumferential surface 209a of the rotor core 209 is set to become gradually thicker from the pole center C1 side toward the pole end E1 side. More specifically, the sixth bridge 236 is formed in substantially the same shape as the fourth bridge 19 (see FIG. 2) of the aforementioned first embodiment.

Further, the thickness t24 of the fourth bridge 234 formed between the fourth cavity portion 214 positioned on the pole center C1 side of the sixth cavity portion 216 with one cavity portion 215 (the fifth cavity portion 215) therebetween and the outer circumferential surface 209a of the rotor core 209 is set to be thicker gradually from the pole end E1 side toward the pole center C1 side. More specifically, the fourth bridge 234 is formed in substantially the same shape as the second bridge 17 (see FIG. 2) of the aforementioned first embodiment.

Furthermore, a vertex P2 of an imaginary curved line L3 passing through a side surface of the fourth bridge 234 on the fourth cavity portion 214 side and a side surface of the sixth bridge 236 on the sixth cavity portion 216 side is at a position corresponding to the fifth bridge 235 located between the fourth bridge 234 and the sixth bridge 236. Therefore, it is possible to make it difficult to deform the fourth bridge 234 to the sixth bridge 236, to which the stress generated by the force due to the centrifugal force is greatly applied. As a result, it is difficult for the entire rotor core 209 to be deformed.

Figure 5:
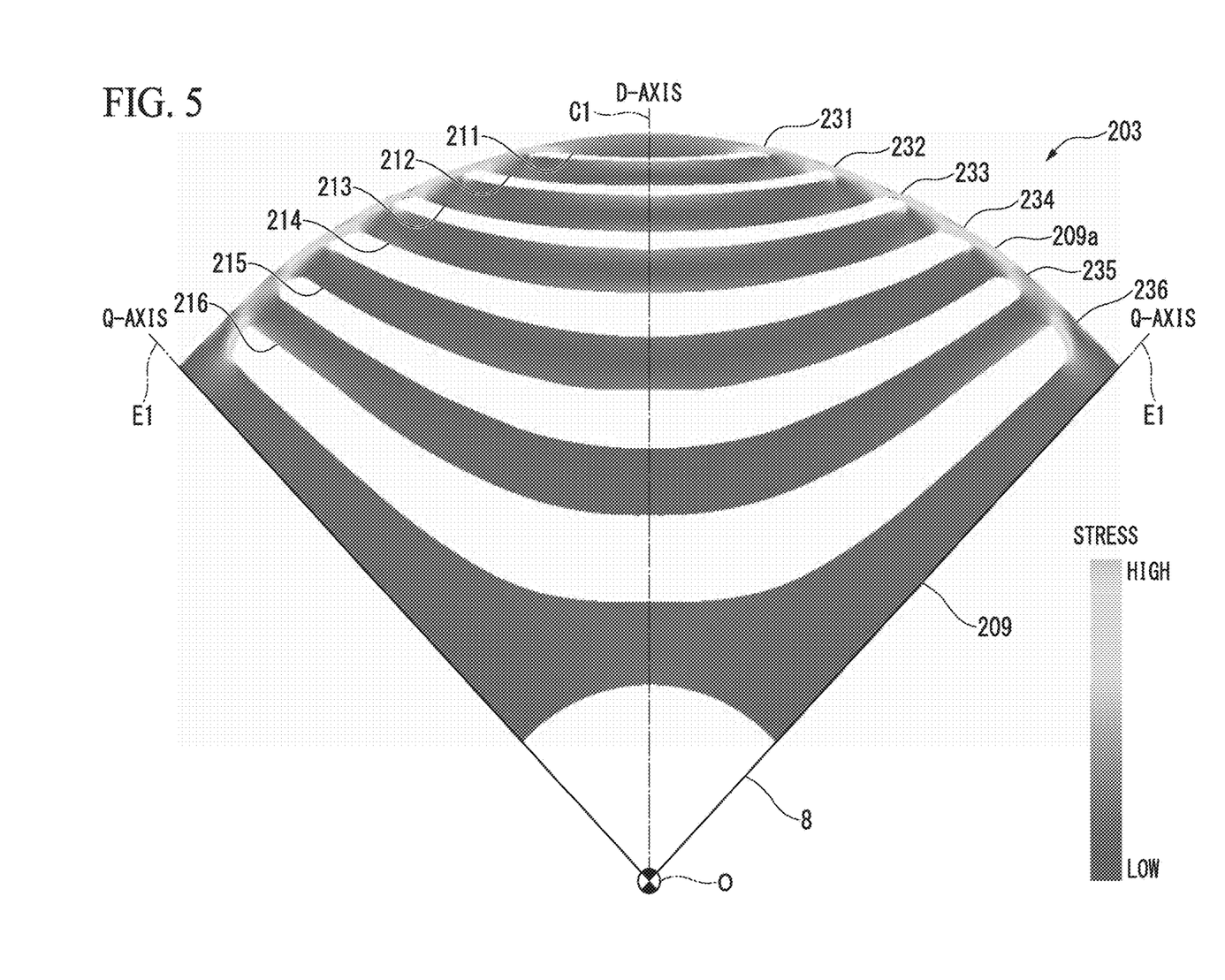
FIG. 5 is a stress distribution diagram of a rotor core of the second embodiment.

FIG. 5 is a stress distribution diagram applying to the rotor core 209 when the rotor 203 is rotated at a high speed, which corresponds to FIG. 3 described above.

As shown in the figure, it can be confirmed that since the average stress applied to all the bridges (the first to the sixth bridges 231 to 236) is reduced, the maximum stress applied to each bridge 231 to 236 is suppressed.

Therefore, according to the aforementioned second embodiment, it is possible to provide the same effects as those of the first embodiment.

Also, as in the second embodiment, even if the rotor core 209 has six layers of cavity portions 211 to 216, the sixth bridge 236 positioned closest to the pole end E1 side and the fourth bridge 234 positioned on the pole center C1 side across the interposed fifth bridge 235 from the sixth bridge 236 are respectively formed to have substantially the same shape as the fourth bridge 19 and the second bridge 17 in the above-described first embodiment, whereby it is possible to make the entire rotor core 209 less deformable.

In addition, the configuration of the center bridges 241 to 246 in the second embodiment may be adapted in the rotor core 9 of the first embodiment described above.

Further, in the aforementioned embodiment, the case where the cavity portions 11 to 14 and 211 to 216 are simply formed in the rotor cores 9 and 209 has been described. However, the present invention is not limited thereto, and a nonmagnetic material (for example, a nonconductive resin), a permanent magnet, a secondary conductor (aluminum, copper, or the like), etc., may be inserted into the cavity portions 11 to 14 and 211 to 216.

Also, in the aforementioned embodiment, the case where the rotor cores 9 and 209 are configured to have four poles so that four salient poles are formed on the outer circumferential surfaces 9a and 209a has been described. However, the configuration of the poles of the rotor cores 9 and 209 is not limited to four poles.

Further, the number of cavity portions 11 to 14 and 211 to 216 for each pole is not limited to four or six and may be four or more plural.

In at least one embodiment described above, in the rotor cores 9 and 209, the thicknesses t4 and 26 of the bridges (the fourth bridge 19 and the sixth bridge 236) formed between the radially innermost cavity portions (the fourth cavity portion 14 and the sixth cavity portion 216) and the outer circumferential surfaces 9a and 209a of the rotor cores 9 and 209 are set to be gradually thicker from the pole center C1 side toward the pole end E1 side.

Further, in the rotor cores 9 and 209, the thicknesses t2 and 24 of the bridges (the second bridge 17 and the fourth bridge 234) formed between the cavity portions (the second cavity portion 12 and the fourth cavity portion 214) positioned radially inward across one cavity portion (the third cavity portion 13 and the fifth cavity portion 215) from the radially innermost cavity portions (the fourth cavity portion 14 and the sixth cavity portion 216) and the outer circumferential surfaces 9a and 209a of the rotor cores 9 and 209 are set to be gradually thicker from the pole end E1 side toward the pole center C1 side. For this reason, the rotor cores 9 and 209 are made less deformable and deterioration of the torque characteristics of the rotating electrical machine 1 can be prevented.

That is, irrespective of the number of layers in the cavity portions, the bridge located closest to the pole end E1 side and the bridge located on the pole center C1 side of the outermost bridge with one bridge interposed therebetween are formed to be the same as the bridges 19, 17, 236 and 234. Thus, it is possible to make the entire rotor cores 9 and 209 less deformable. As a result, deterioration of the torque characteristics of the rotating electric machine 1 can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the inventions. The accompanying claims and their equivalents are intended to cover such forms or modifications as would fall within the scope of the inventions.

What is claimed is:

1. A synchronous reluctance rotating electrical machine comprising:
   a shaft which rotates around a rotational axis line; and
   a rotor core fixed to the shaft, in which cavity portions being formed in a projected shape toward a radially inward direction are formed into multilayers for each pole and bridges are respectively formed between the cavity portions and an outer circumferential surface;
   wherein when a center of said each pole in a circumferential direction is a pole center and both ends in the circumferential direction are pole ends, an outermost bridge positioned outermost on the pole end side among the plurality of bridges is formed such that the thickness of the outermost bridge becomes gradually thicker from the pole center side toward the pole end side, and
   an intermediate bridge positioned on the pole center side across one interposed bridge from the outermost bridge among the plurality of bridges is formed such that the thickness of the intermediate bridge becomes gradually thicker from the pole end side toward the pole center side,
   wherein when a curved line passing through a side surface of the outermost bridge on a cavity portion side and a side surface of the intermediate bridge on a cavity portion side is an imaginary curved line, a straight line connecting the rotational axis line and a point on the imaginary curved line which is most distant away from the rotational axis passes through the bridge interposed between the outermost bridge and the intermediate bridge.

2. The synchronous reluctance rotating electrical machine according to claim 1,
   wherein the rotor core has four poles and has four layers of the cavity portions for each pole.

3. The synchronous reluctance rotating electrical machine according to claim 1,
   wherein the rotor core has four poles and has four layers of the cavity portions for each pole.

* * * * *